Patented Apr. 13, 1954

2,675,379

UNITED STATES PATENT OFFICE 2,675,379

PROCESS OF PRODUCING SULFA-QUINOXALINE

Ralph H. Beutel, Newark, N. J., assignor to Merck & Co., Inc., Rahway, N. J., a corporation of New Jersey No Drawing. Application December 14, 1951, Serial No. 261,763

7 Claims. (Cl. 260—239.7)

This invention relates to an improved process for the preparation of substituted sulfanilamide compounds; more particularly it relates to a new method of preparing sulfaquinoxaline by the reaction of 2-haloquinoxaline and sulfanilamide.

2-sulfanilamidoquinoxaline possesses valuable chemo-therapeutic properties, clinical studies having shown its effectiveness in the treatment of bacterial infections. For example, this drug has been effective in reducing the mortality rate due to coccidiosis, a disease of young chicks caused by the microscopic parasite, *Eimeria tenella*. Likewise, the administration of 2-sulfanilamidoquinoxaline (sulfaquinoxaline) has successfully checked and reduced mortality in acute fowl cholera, a bacterial disease of poultry caused by *Pasteurella multocida*. In addition to its remarkable therapeutic properties, an outstanding advantage in the administration of this drug is that it does not in any way seriously affect egg production, shell texture, fertility and hatchability of the eggs produced while the hens are on effective levels of medication.

One method described by Weijlard et al., J. A. C. S., 66, 1957 (1944), for the preparation of 2-sulfanilamidoquinoxaline involves reacting 2-aminoquinoxaline with acetylsulfanilylchloride in the presence of pyridine to form acetylsulfanilamidoquinoxaline, and hydrolyzing the latter compound to remove the acetyl group. From a commerical point of view this process is not entirely desirable since the starting material, 2-aminoquinoxaline is expensive and difficult to prepare. Further, the desired product is not obtained directly and must be prepared by hydrolyzing the acetylsulfanilamidoquinoxaline.

It has also been proposed to prepare sulfaquinoxaline by reacting 2-haloquinoxaline with sulfanilamide in the presence of an acid binding agent, such as an alkali metal hydroxide, an alkali metal carbonate, and the like. Unfortunately, this method suffers from the serious disadvantage that it is very difficult to carry out this reaction on a commercial scale. Thus, while the reaction mixture of 2-chloroquinoxaline, sulfanilamide and potassium carbonate is initially a heterogeneous liquid slurry, upon heating it thickens to a heavy sticky paste which conglomerates and forms a heterogeneous ball. Solid lumps of potassium carbonate are thereby interspersed within the sticky walls thereby preventing complete reaction. Also, it is almost impossible to heat the reaction mixture uniformly to the desired reaction temperature without causing local overheating. As a result, the yields of sulfaquinoxaline obtained by this method have been low, and the quality of the product has been poor. Further, the desired product is also found to be contaminated with quantities of unreacted starting material which are difficult to separate from the sulfaquinoxaline.

It is an object of the present invention to provide an improved process for preparing sulfaquinoxaline which will avoid the difficulties encountered in previously described processes. It is a particular object of this invention to provide an improved method for preparing sulfaquinoxaline by reacting 2-haloquinoxaline with sulfanilamide in the presence of an acid binding agent whereby the product may be readily prepared commercially in enhanced yields and in excellent quality. Other objects will be apparent from the detailed description hereinafter provided.

In accordance with this invention, I have found that this desideratum is achieved by reacting sulfanilamide with 2-haloquinoxaline in the presence of a granular acid binding agent, a high boiling solvent and diatomaceous earth. In carrying out my improved procedure, a solution of 2-haloquinoxaline in a high boiling solvent, solid sulfanilamide, a granular solid acid binding agent, and a quantity of diatomaceous earth are charged to a suitable reaction vessel equipped with an agitator, a means for internally heating to a temperature of the order of 175° C. and a reflux condenser provided with a means of separating the water of reaction from the solvent distilled. After the reaction mixture has been intimately contacted by stirring, it is heated to the desired reaction temperature of about 150–200° C. and maintained at this temperature for sufficient time to complete the reaction. During this heating the water of reaction formed distills off with the high boiling solvent and is discarded, the solvent being returned to the reaction mixture. When the reaction is carried out under these conditions, the reaction mixture remains fluid throughout the period of reaction and may be uniformly heated without overheating any portion of the batch. Further, under optimum conditions, yields of good quality sulfaquinoxaline above 95% are obtained.

After completion of the reaction, the sulfaquinoxaline is readily recovered from the reaction mixture by diluting with water, filtering, separating the aqueous phase from the solvent phase, and acidifying the aqueous phase to precipitate the desired product.

Various high boiling solvents or mixtures of such solvents are suitable in carrying out the improved process of my invention. More particularly, I have found that solvents having a boiling point of approximately 150–200° C. are eminently suitable for use in my process. Satisfactory solvents that might be mentioned are secondary butyl benzene, decalin (decahydronaphthalene), diethylbenzene, capryl alcohol and the like.

The amount of solvent employed in the reaction may vary considerably depending upon the specific solvent used. Generally, I find it desirable to employ just sufficient solvent to maintain the reaction mixture in a fluid state during the period of heating. However, larger amounts of solvent may also be employed although I find that the use of large amounts of solvent is somewhat uneconomical. In using secondary butyl benzene as a solvent, for example, I find that a solvent to 2-haloquinoxaline ratio of about 3:1 is most suitable.

In order to avoid having the reaction mixture conglomerate into an intractable solid mass, I find that it is necessary to include in the reaction mass a quantity of diatomaceous earth. It is indeed surprising and unexpected to find that diatomaceous earth is so effective in maintaining the reaction mixture in a fluid condition and thus preventing the conglomeration of the reaction mixture. It certainly would not have been anticipated that the addition of a solid product such as diatomaceous earth would result in maintaining the mixture in a fluid state. Generally, I find that it is desirable to add about 15–50% of diatomaceous earth based on the weight of sulfaquinoxaline, although greater or lesser amounts may also be employed depending upon the particular diatomaceous earth used, the volume of solvent employed, etc. Usually, I find that an amount of diatomaceous earth equivalent to about 35% by weight of the sulfaquinoxaline will result in maximum yields of sulfaquinoxaline under optimum conditions.

Although the various acid binding agents mentioned above may be used in my improved process, I prefer to utilize potassium carbonate as the alkaline agent, since I have found that the desired product can be obtained in practically quantitative yields with this agent. Further, I have found that the particle size of the potassium carbonate asserts considerable influence on the yield of sulfaquinoxaline obtained. Generally, quite contrary to what might have been anticipated, I find that the use of granular potassium carbonate is most satisfactory in carrying out my improved process. Thus, the commercial grade of calcined granular potassium carbonate is particularly useful in my process and results in the obtainment of yields of sulfaquinoxaline in excess of 90% of theory. The use of powdered potassium carbonate results in yields of about 40% of theory. On the other hand, coarse potassium carbonate, below screen mesh size 12, results in an easily agitated mass which, however, also results in lower yields of the desired product.

In particular, I have found that potassium carbonate which passes through a 12-mesh screen but is retained on a 40-mesh screen, produces sulfaquinoxaline yields of 97% or more. Therefore, in carrying out my improved process, I prefer to utilize potassium carbonate having a particle size which will pass through a 12-mesh and be retained on a 40-mesh screen.

As indicated above, the reaction can be effected at temperatures ranging from about 150–200° C. At a temperature of about 150° C., the reaction proceeds more slowly and a longer reaction period is required. Reaction temperatures in excess of about 200° C. result in lowered yields of the desired product and are therefore considered unsatisfactory. I have found that under optimum conditions maximum yields are obtained by heating the reaction mixture at about 175° C.

The following examples are presented as illustrative embodiments of my invention. In these examples the quantities of materials used are in parts by weight.

*Example 1*

A suitable reaction vessel provided with means of heating to an internal temperature of about 175° C., an agitator, and a reflux condenser with a water separator was charged with the following:

1910 parts of a solution of 505 parts of chloroquinoxaline in secondary butyl benzene.
295 parts of diatomaceous earth.
552 parts of calcined technical potassium carbonate.
631 parts of sulfanilamide.

The resulting reaction mixture was heated with stirring. At about 145° C. the mixture began to reflux and a mixture of secondary butyl benzene and water of reaction distilled. The water was separated from the solvent which was returned to the still.

The batch temperature gradually increased as the water was removed and finally leveled off at about 175° C. The reaction mass was heated under reflux for five hours from the time that the batch temperature reached 170° C.

At the end of this heating period, the mixture was allowed to cool to about 100° C. and 2900 parts of hot water was added. After filtering the resulting solution, the lower aqueous layer was separated from the solvent layer which was discarded after washing with fresh water to remove all traces of the product.

The resulting aqueous layer, combined with the aqueous washes of the filter press and the solvent layer, was then treated with about 0.64 part of sodium sulfide and heated to boiling to remove any traces of solvent. The solution was then cooled to about 85° C. and sufficient 38% sulfuric acid added to reduce the pH to about 9.9. To this solution was added about 5300 parts of water, 25 parts of diatomaceous earth, and 25 parts of activated charcoal. After cooling to about 25°–40° C. and aging for about 8 hours, the resulting solution was filtered and the residue remaining on the filter was washed with water to recover any product remaining in the residue.

To the filtrate was added 4.3 parts of citric acid and the resulting solution was heated to 100° C. The sulfaquinoxaline was precipitated by adding to the hot solution sufficient 38% sulfuric acid to reduce the pH to about 6.5–7.0. The precipitated sulfaquinoxaline was then recovered by centrifuging and drying. About 850 parts (92% of theory) of sulfaquinoxaline melting between 248° and 252° C. was obtained.

*Example 2*

When the procedure described in Example 1 was repeated using milled potassium carbonate in place of the granular product only 39% of theory of sulfaquinoxaline was obtained.

*Example 3*

A number of further experiments were run following the procedure of Example 1 to determine the effect of the particle size of anhydrous potassium carbonate on the yield of sulfaquinoxaline. The following table summarizes the results of these experiments.

| Particle Size of Potassium Carbonate Mesh Size | | Yield of Sulfaquinoxaline (% of Theory) |
|---|---|---|
| Through | Retained | |
| — | 12 | 84.0 |
| 12 | 20 | 97.5 |
| 20 | 40 | 95.5; 99.0* |
| 12 | 40 | 98.7; 99.0* |
| 40 | 60 | 90.6; 88.0* |
| 60 | 100 | 92.1; 91.5* |
| 100 | — | 43.4 |
| Unscreened granular K₂CO₃ | | 92.4 |

* Results of duplicate runs.

Various changes and modifications may be made in carrying out the present invention without departing from the spirit and scope thereof. Insofar as these changes and modifications are within the purview of the annexed claims, they are to be considered as part of my invention.

I claim:

1. The process for the production of sulfaquinoxaline which comprises heating a mixture of 2-haloquinoxaline, sulfanilamide, granular potassium carbonate, diatomaceous earth and an inert high boiling solvent to a temperature of about 150–200° C.

2. The process for the production of sulfaquinoxaline which comprises heating a mixture of 2-chloroquinoxaline, sulfanilamide, granular potassium carbonate, diatomaceous earth and an inert high boiling solvent to a temperature of about 150–200° C.

3. The process for the production of sulfaquinoxaline which comprises heating a mixture of 2-haloquinoxaline, sulfanilamide, granular potassium carbonate, diatomaceous earth and secondary butylbenzene to a temperature of about 150–200° C.

4. The process for the production of sulfaquinoxaline in enhanced yields which comprises intimately contacting 2-chloroquinoxaline with sulfanilamide in the presence of granular potassium carbonate, diatomaceous earth and a high boiling solvent and heating the resulting mixture to about 175° C.

5. The process for the production of sulfaquinoxaline in enhanced yield which comprises intimately contacting 2-chloroquinoxaline with sulfanilamide in the presence of granular potassium carbonate, diatomaceous earth, and secondary butylbenzene, and heating the resulting mixture to about 175° C.

6. The process for the production of sulfaquinoxaline in enhanced yield which comprises intimately contacting 2-chloroquinoxaline with sulfanilamide in the presence of granular potassium carbonate having a mesh size of about 12–40 mesh, diatomaceous earth, and a high boiling solvent, and heating the resulting mixture to about 175° C.

7. The process for preparing sulfaquinoxaline in enhanced yield which comprises heating together a mixture consisting of 2-chloroquinoxaline, sulfanilamide, granular potassium carbonate, diatomaceous earth, and a high boiling solvent to a temperature of about 175° C., and recovering sulfaquinoxaline from the resulting reaction mixture.

References Cited in the file of this patent

UNITED STATES PATENTS

| Number | Name | Date |
|---|---|---|
| 2,444,012 | Northey et al. | June 22, 1948 |
| 2,475,673 | Northey et al. | July 12, 1949 |

FOREIGN PATENTS

| Number | Country | Date |
|---|---|---|
| 621,289 | Great Britain | Apr. 7, 1949 |